(12) United States Patent
Oyama

(10) Patent No.: US 9,046,940 B2
(45) Date of Patent: Jun. 2, 2015

(54) ELECTRONIC APPARATUS AND DRAWING METHOD

(71) Applicant: Kabushiki Kaisha Toshiba, Tokyo (JP)

(72) Inventor: Dai Oyama, Tachikawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 178 days.

(21) Appl. No.: 13/762,840

(22) Filed: Feb. 8, 2013

(65) Prior Publication Data
US 2014/0118312 A1    May 1, 2014

(30) Foreign Application Priority Data
Oct. 31, 2012   (JP) ................... 2012-240982

(51) Int. Cl.
| G06F 3/033 | (2013.01) |
| G06F 3/0354 | (2013.01) |
| G06F 3/038 | (2013.01) |
| G06F 3/0488 | (2013.01) |

(52) U.S. Cl.
CPC ............ *G06F 3/03545* (2013.01); *G06F 3/038* (2013.01); *G06F 3/04883* (2013.01)

(58) Field of Classification Search
None
See application file for complete search history.

(56) References Cited

U.S. PATENT DOCUMENTS

| 4,831,568 A * | 5/1989 | Ito .................................. 708/141 |
| 5,877,750 A * | 3/1999 | Hanson ......................... 345/173 |
| 6,072,474 A | 6/2000 | Morimura et al. |
| 2011/0057880 A1 * | 3/2011 | Kasahara ...................... 345/158 |
| 2011/0234516 A1 | 9/2011 | Nakajima et al. |

FOREIGN PATENT DOCUMENTS

| JP | 02-091715 A | 3/1990 |
| JP | 09-091076 A | 4/1997 |
| JP | 2003-150903 A | 5/2003 |
| JP | 2011-204141 A | 10/2011 |

OTHER PUBLICATIONS

First Office Action mailed by Japan Patent Office on May 7, 2013 in the corresponding Japanese Application 2012-240982—6 pages.
Masuki, Ryotaro Suzaki, Tetsunosuke Inaba, Akira Tomioka, Kaori Kikuchi, "Guide to Drawing Digital Manga and Digital Comic with COMICWORKS2," First Edition, Ohmsha, Ltd., Jun. 25, 2004, p. 109-114.

* cited by examiner

*Primary Examiner* — Nicholas Lee
(74) *Attorney, Agent, or Firm* — Knobbe, Martens, Olson & Bear LLP

(57) ABSTRACT

According to one embodiment, an electronic apparatus includes a first obtaining module, a second obtaining module, a correction module, and a drawing processor. The first obtaining module detects a position of a stylus on a writing surface of a sensor. The second obtaining module obtains writing pressure by the stylus. The correction module corrects the writing pressure obtained by the second obtaining module based on a selected first line width. The drawing processor draws a locus of the obtained position of the stylus on a display screen. The drawing processor has a first mode. The locus has a line width based on the writing pressure corrected by the correction module in the first mode.

20 Claims, 7 Drawing Sheets

ELECTRONIC APPARATUS AND DRAWING METHOD

CROSS-REFERENCE TO RELATED APPLICATIONS

This application is based upon and claims the benefit of priority from Japanese Patent Application No. 2012-240982, filed Oct. 31, 2012, the entire contents of which are incorporated herein by reference.

FIELD

Embodiments described herein relate generally to an electronic apparatus and a drawing method, in which a locus is drawn in accordance with stylus input.

BACKGROUND

Computers which include digitizers configured to perform stylus input have started to become widespread. When stylus input is performed, stylus input is performed on the glass on the digitizer, and thus the user sometimes feels uncomfortable in writing.

When stylus input is performed, stylus input is performed on the glass on the digitizer, and thus the user sometimes feels uncomfortable in writing.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

DETAILED DESCRIPTION

Figure 1:
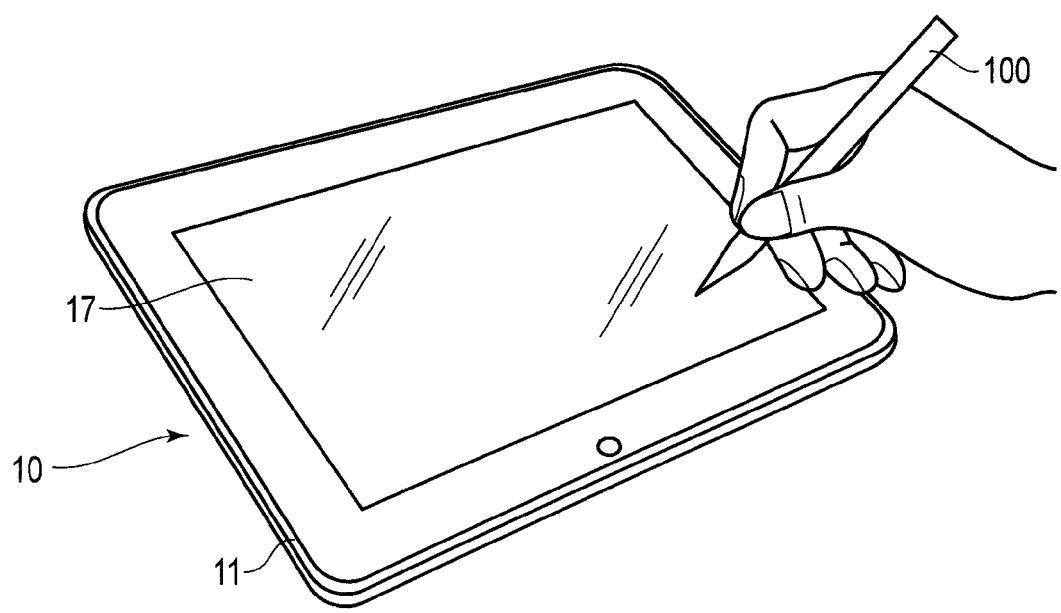
FIG. 1 is an exemplary perspective view of an external appearance of an electronic apparatus according to an embodiment.

Various embodiments will be described hereinafter with reference to the accompanying drawings.

In general, according to one embodiment, an electronic apparatus includes a first obtaining module, a second obtaining module, a correction module, and a drawing processor. The first obtaining module is configured to detect a position of a stylus on a writing surface of a sensor. The second obtaining module is configured to obtain writing pressure by the stylus. The correction module is configured to correct the writing pressure obtained by the second obtaining module based on a selected first line width. The drawing processor is configured to draw a locus of the obtained position of the stylus on a display screen. The drawing processor has a first mode. The locus has a line width based on the writing pressure corrected by the correction module in the first mode.

FIG. 1 is a perspective view illustrating an external appearance of a tablet computer 10 according to an embodiment. The tablet computer 10 is a portable electronic apparatus which is called tablet or straight computer, and comprises a main body 11 and a touchscreen display 17, as illustrated in FIG. 1. The touchscreen display 17 is attached to the main body 11 such that the touchscreen display 17 is superposed on an upper surface of the main body 11.

The main body 11 includes a housing which has a thin box shape. The touchscreen display 17 includes a flat panel display, and a sensor which is configured to sense a position on a screen of the flat panel display, which a stylus or a finger touches. The flat panel display may be, for example, a liquid crystal display device (LCD). For example, a capacitive touchpanel or an inductive digitizer can be used as the sensor. In the following example, suppose that both the two sensors, that is, a digitizer and a touchpanel, are incorporated in the touchscreen display 17.

Each of the digitizer and the touchpanel is provided to cover the screen of the flat panel display. The touchscreen display 17 can sense not only touch operation on the screen using a finger, but also touch operation on the screen using a stylus 100. The stylus 100 may be, for example, an inductive stylus. The user can perform handwriting input operation on the touchscreen display 17, by using an external object (stylus 100 or finger). During handwriting input operation, loci of movement of the external object (stylus 100 or finger) on the screen, that is, loci (handwriting) of strokes handwritten by handwriting input operations are drawn in real time, and thereby a locus of each stroke is displayed on the screen. A locus of movement of the external object while the external object is in contact with the screen corresponds to a stroke. A group of many strokes which correspond to handwritten characters or figures, that is, a group of many loci (handwriting) form a handwritten document.

In the present embodiment, the handwritten document is stored in a storage medium, as time-series information which indicates coordinate lines of loci of respective strokes and the order relation between the strokes, not image data. The time-series information generally means a group of time-series stroke data items which correspond to respective strokes. Each stroke data item corresponds to a stroke, and includes a series of coordinate data (time-series coordinates) which correspond to points on the locus of the stroke. The order of arrangement of these stroke data items corresponds to the order of handwriting of the strokes, that is, the stroke order.

The tablet computer 10 can read desired existing time-series information from the storage medium, and display a handwritten document which corresponds to the time-series information, that is, loci which correspond to respective strokes indicated by the time-series information.

Figure 2:
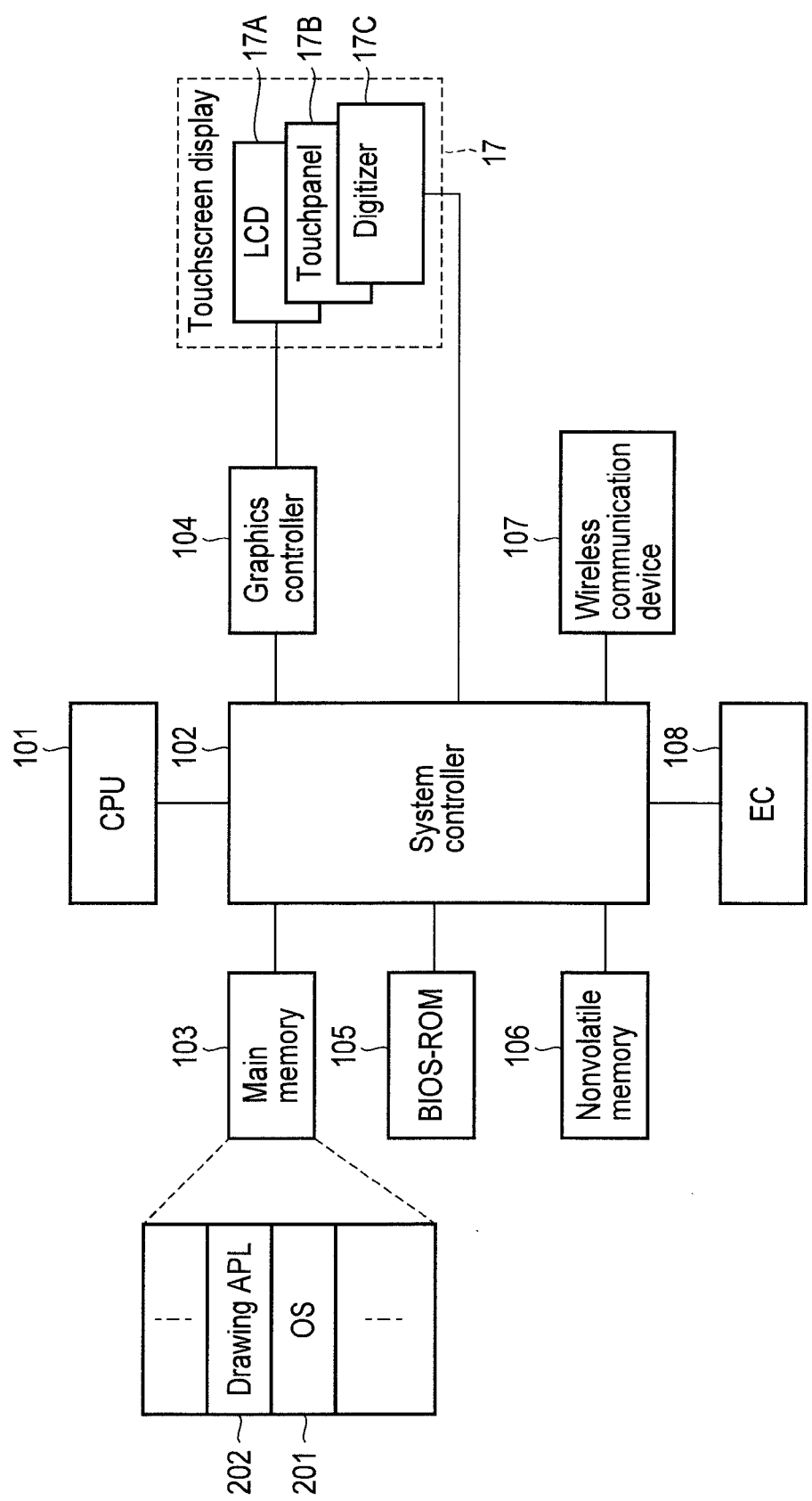
FIG. 2 is an exemplary block diagram illustrating a system configuration of the electronic apparatus of the embodiment.

FIG. 2 is a diagram illustrating a system configuration of the tablet computer 10.

As illustrated in FIG. 2, the tablet computer 10 comprises a CPU 101, a system controller 102, a main memory 103, a graphics controller 104, a BIOS-ROM 105, a nonvolatile memory 106, a wireless communication device 107, and an embedded controller (EC) 108.

The CPU 101 is a processor which controls operation of the modules in the tablet computer 10. The CPU 101 executes various software items loaded from the nonvolatile memory 106, which is a storage device, into the main memory 103. The software items include an operating system (OS) 201, and various application programs. The application programs include a drawing application 202. The drawing application 202 has a function of preparing and displaying the above handwritten document, and the like.

The CPU 101 also executes a basic input/output system (BIOS) which is stored in the BIOS-ROM 105. The BIOS is a program for hardware control.

The system controller 102 is a device which connects a local bus of the CPU 101 with various components. The system controller 102 also includes a memory controller which controls access to the main memory 103. The system controller 102 also has a function of executing communication with the graphics controller 104 through a serial bus of the PCI EXPRESS standard.

The graphics controller 104 is a display controller which controls an LCD 17A that is used as a display monitor of the tablet computer 10. A display signal which is generated by the graphics controller 104 is transmitted to the LCD 17A. The LCD 17A displays a picture image based on the display signal. A touchpanel 17B and a digitizer 17C are arranged on the LCD 17A. The touchpanel 17B is a capacitive pointing device configured to perform input on the screen of the LCD 17A. The touchpanel 17B detects a touch position on the screen, which the finger touches, and movement of the touch position. Touchpanel 17B outputs coordinates which indicate the touch position on the screen. The digitizer 17C is an inductive pointing device configured to perform input on the screen of the LCD 17A. The digitizer 17C detects a position (coordinates) of the stylus 100 on the screen, which the stylus 100 touches, and movement of the position of the stylus 100. The digitizer 17C outputs coordinates which indicates the position of the stylus 100 on the screen.

The wireless communication device 107 is a device configured to execute wireless communication such as wireless LAN and 3G mobile communication. The EC 108 is a one-chip microcomputer which includes an embedded controller for electric power control. The EC 108 has a function of turning on and off the tablet computer 10, in response to operation of the power button by the user.

The drawing application 202 has a first mode and a second mode. In the first mode, the drawing application 202 draws a locus of a width, which corresponds to a line width (thickness and diameter) selected by the user interface and a writing pressure. In the second mode, the drawing application 202 draws a locus of a width, which corresponds to the line width selected by the user interface and is independent of the writing pressure.

Figure 3:
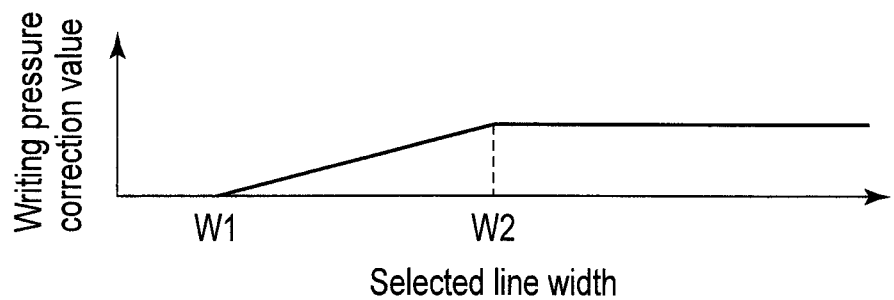
FIG. 3 is an exemplary diagram illustrating relation between the selected line width and the writing pressure correction quantity.

In the first mode, the drawing application 202 corrects the writing pressure, in accordance with the line width selected by the user interface. FIG. 3 illustrates relation between the selected line width and the writing pressure correction quantity. As illustrated in FIG. 3, in the case of selecting a line width falling within a range from line width W1 to line width W2, the correction quantity increases in a linear function manner, as the line width increases. In the case of selecting a line width greater than line width W2, the correction quantity is fixed regardless of the line width.

Figure 4:
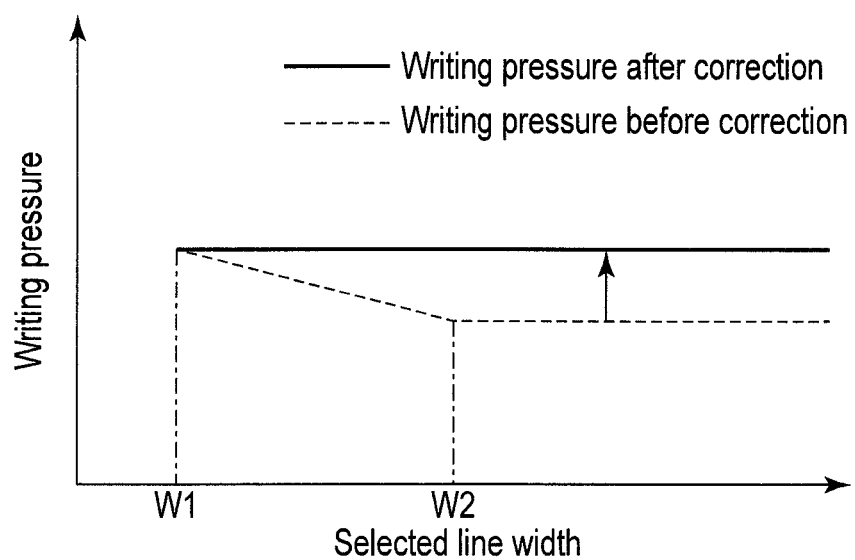
FIG. 4 is an exemplary diagram illustrating relation between the line width and the writing pressures before and after correction.

The relation illustrated in FIG. 3 may also be illustrated as relation between the selected line width and the writing pressures before and after correction, as illustrated in FIG. 4. In FIG. 4, the user's writing pressure before correction decreases due to increase in thickness of the drawn line. Therefore, correction of the line width in accordance with the writing pressure cannot be accurately performed. As illustrated in FIG. 4, the corrected writing pressure is uniform, and drawing of the line width determined in accordance with change in user's writing pressure is performed, regardless of the selected line width.

In addition, in the first mode, the drawing application 202 can further change the correction value, between the value adopted at the start of drawing and the value adopted in the middle of drawing.

The static frictional force which acts on the object when the static object is moved is greater than the dynamic frictional force which acts on the moving object. Therefore, a coefficient of static friction, which is a coefficient of friction at the start of drawing, is greater than a coefficient of dynamic friction, which is a coefficient of friction during drawing.

The drawing application 202 includes a table of correction quantities for the coefficients of static friction, and a table of correction quantities for the coefficients of dynamic friction. At the start of drawing, the drawing application 202 selects a correction quantity in accordance with the coefficient of static friction between the stylus and the writing surface from the table. During drawing, the drawing application 202 selects a correction quantity in accordance with the coefficient of dynamic friction between the stylus and the writing surface from the table. Based on the selected two correction quantities, the drawing application 202 changes the correction quantity between the correction quantity at the start of drawing and the correction quantity in the middle of drawing. The writing surface is a surface of the touchscreen display 17.

Besides, in the first mode, the drawing application 202 can further change the correction value, according to whether the coefficient of friction between the writing surface and the stylus changes in accordance with the writing pressure or not.

Figure 5:
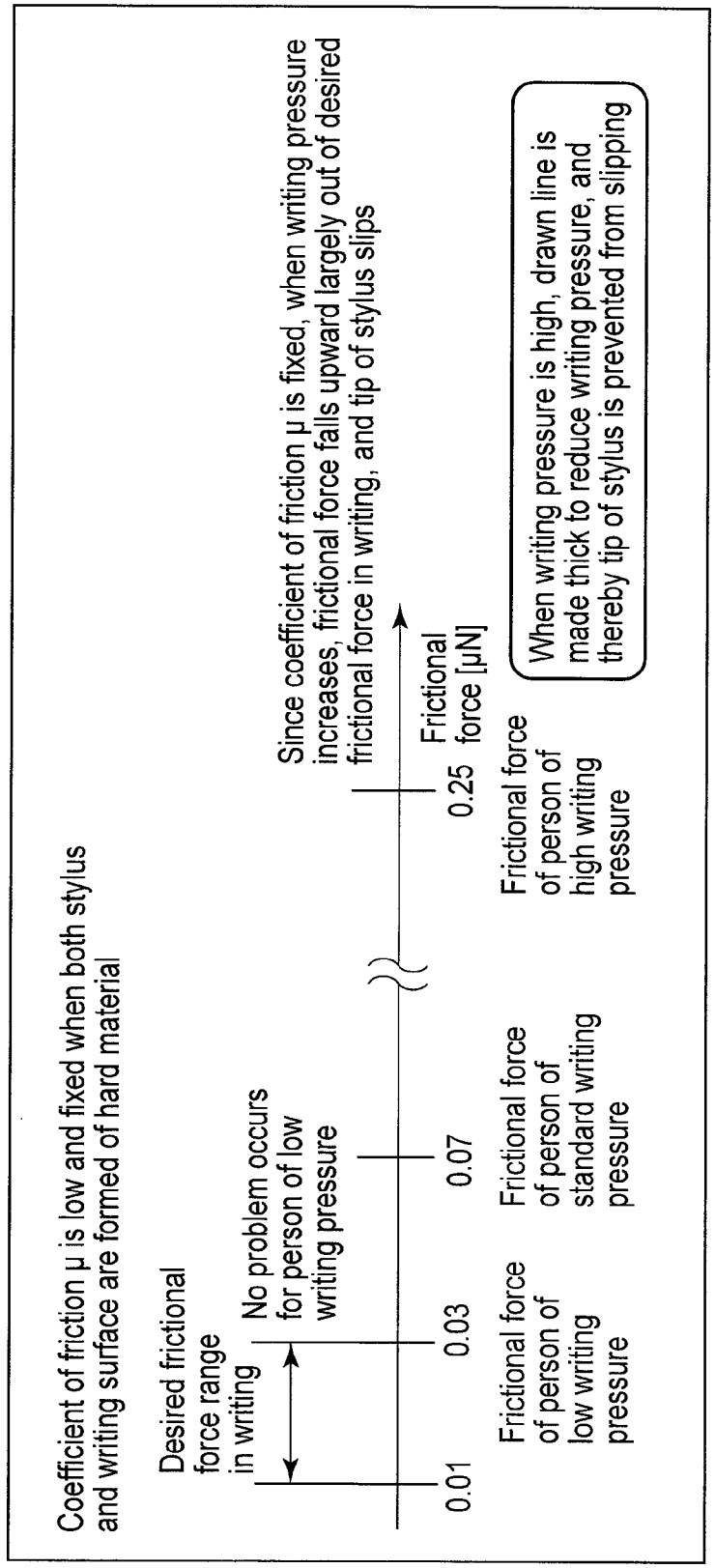
FIG. 5 is an exemplary diagram illustrating frictional forces of the stylus of a person of high writing pressure and a person of low writing pressure, in the case where both the stylus and the writing surface are formed of hard material.

The coefficient of friction is not changed in accordance with the writing pressure, when both the writing surface and the tip of the stylus are formed of hard material. As illustrated in FIG. 5, since the coefficient of friction is fixed, when the writing pressure increases, frictional force falls upward greatly out of a desired frictional force range obtained by a combination of the materials of the writing surface and the tip of the stylus, and the tip of the stylus slips. Therefore, when a person of high writing pressure performs writing, the tip of the stylus slips on the writing surface. Therefore, when the coefficient of friction is not changed in accordance with the writing pressure, a correction quantity is added to writing pressure which is greater than or equal to the writing pressure which generates desired frictional force in writing. By adding the correction quantity, the drawn locus is made thick, and thereby the user reduces the writing pressure unconsciously, and slip of the tip of the stylus is reduced. The desired frictional force in writing is determined in accordance with the materials of the tip of the stylus and the writing surface.

Figure 6:
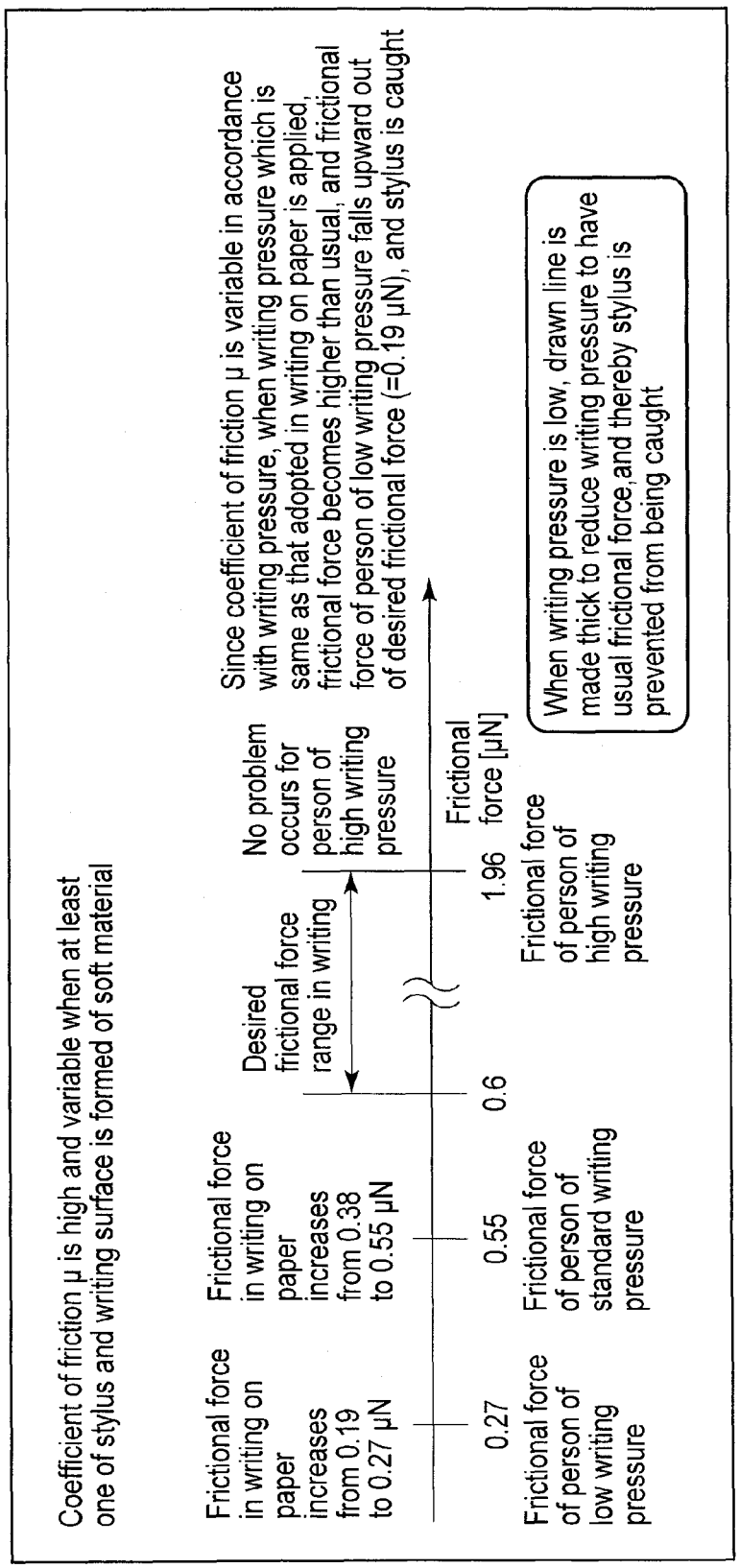
FIG. 6 is an exemplary diagram illustrating frictional forces of the stylus of a person of high writing pressure and a person of low writing pressure, in the case where at least one of the stylus and the writing surface is formed of soft material.

When at least one of the writing surface and the tip of the stylus is formed of soft material, the coefficient of friction is changed in accordance with the writing pressure. Specifically, the coefficient of friction increases as the writing pressure increases. Since the coefficient of friction increases as the writing pressure increases, when writing pressure which is the same as the writing pressure adopted in writing on paper is applied to the writing surface, the frictional force becomes greater than usual. For example, in the case of a person of low writing pressure, the frictional force adopted in writing on paper increases from 0.19 to 0.27 μN. For example, in the case of a person of standard writing pressure, the frictional force adopted in writing on paper increases from 0.38 to 0.55 μN. As illustrated in FIG. 6, the frictional force falls upward out of the desired frictional force of a person of low writing pressure, and the tip of the stylus is caught by the writing surface. The term "soft material" means a material which has a Young's modulus of 0.2 GPa or less.

When the coefficient of friction is changed in accordance with the writing pressure, a correction quantity is added to writing pressure which does not exceed the reference writing pressure. By adding the correction quantity, the drawn locus is made appear thick, and thereby the user unconsciously reduces the writing pressure, and the tip of the stylus is prevented from being caught.

In the second mode, the drawing application 202 draws a locus of a fixed width, which corresponds to a line width selected by the user interface, regardless of the writing pressure. In certain setting, however, the drawing application 202 displays a locus of a line width which is different from the selected line width, and thereafter displays a locus of the selected line width after a certain period of time has passed. For example, when the coefficient of friction between the stylus and the writing surface is large and the user's writing pressure is low, a thick locus is displayed in drawing to reduce the user's writing pressure, and a locus of the selected width is displayed after a certain period of time has passed.

Figure 7:
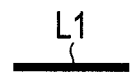
FIG. 7 is an exemplary diagram illustrating a locus which is drawn in a second mode.
Figure 8:
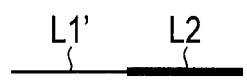
FIG. 8 is an exemplary diagram illustrating a locus which is drawn in the second mode.

As illustrated in FIG. 7, the drawing application 202 draws a locus L1 which is thicker than the selected line width. Then, as illustrated in FIG. 8, a locus L1' of the selected line width is drawn from a part which is drawn at the time when a certain period of time has passed after the start of drawing. The locus L2 is a part which is drawn before a certain period of time has passed after the start of drawing, and drawn with a locus thicker than the selected line width.

Figure 9:
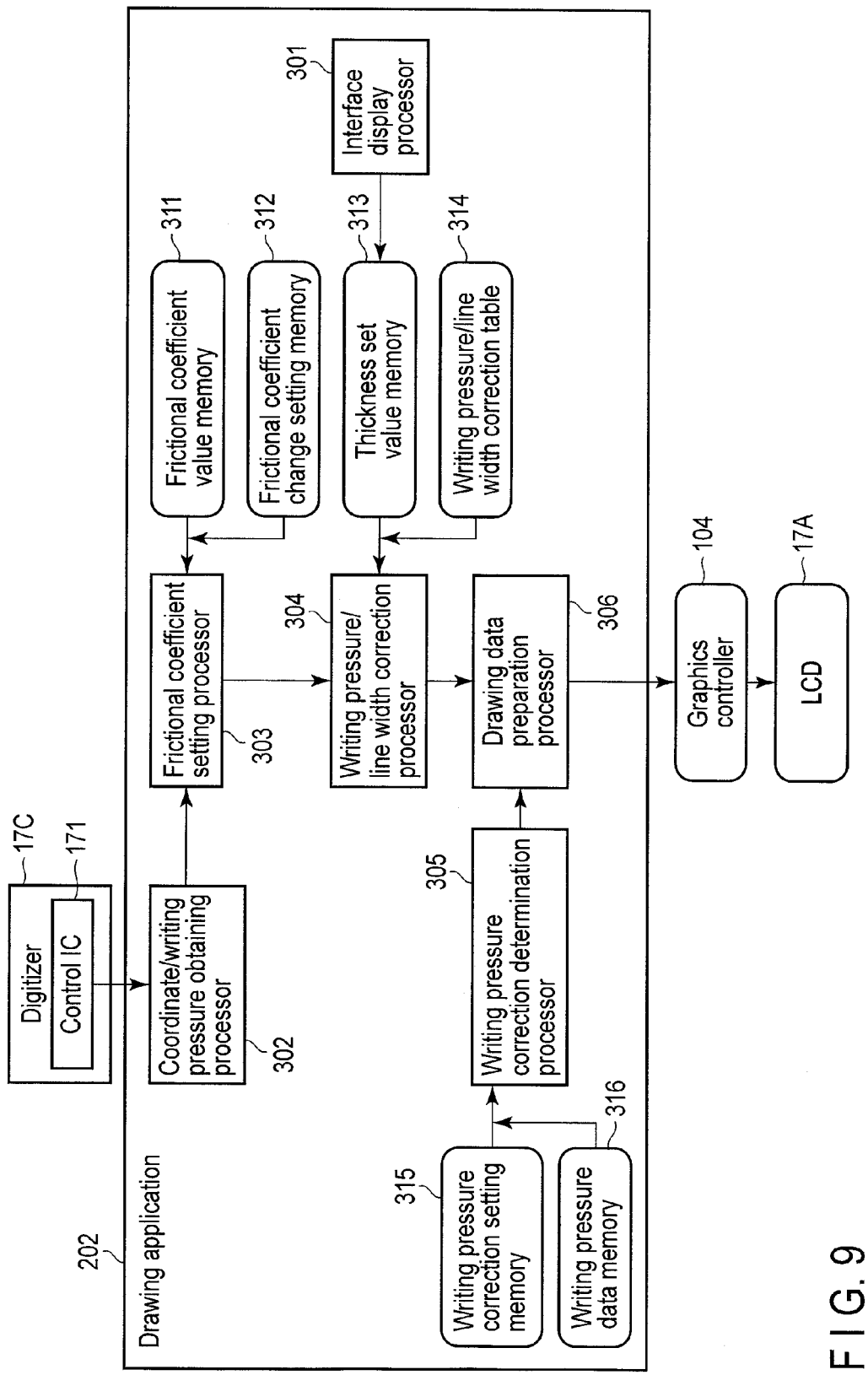
FIG. 9 is an exemplary block diagram illustrating a functional configuration of a drawing application.

Next, the functional configuration of the drawing application 202 will be explained hereinafter with reference to FIG. 9.

The drawing application 202 includes an interface display processor 301, a coordinate/writing pressure obtaining processor 302, a frictional coefficient setting processor 303, a writing pressure/line width correction processor 304, a writing pressure correction determination processor 305, and a drawing data preparation processor 306.

The drawing application 202 secures a frictional coefficient value memory 311, a frictional coefficient change setting memory 312, a line width set value memory 313, a writing pressure/line width correction table 314, a writing pressure correction setting memory 315, and a handwriting data memory 316, for example, on a memory.

The frictional coefficient value memory 311 stores frictional coefficient information, which indicates a static frictional coefficient value and a dynamic frictional coefficient value between the stylus 100 and the writing surface. The frictional coefficient change setting memory 312 stores a frictional coefficient change flag, which indicate whether the frictional coefficient is changed in accordance with the writing pressure. The line width set value memory 313 stores the line width value selected by an interface described later. The writing pressure/line width correction table 314 stores correction quantities which correspond to respective line width values. The writing pressure/line width correction table 314 may store functions which indicate correction quantities that correspond to respective line width values. The writing pressure correction setting memory 315 stores setting information, which indicates whether the application is in the first mode or the second mode. In the first mode, the line width is changed in accordance with the writing pressure. In the second mode, the line width is not changed in accordance with the writing pressure. The handwriting data memory 316 stores history of coordinates which are included in data output from a control IC, which is described later.

The following is explanation of functions of the modules of the drawing application 202.

Figure 10:
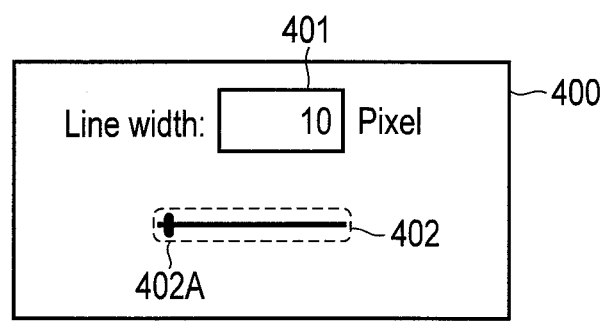
FIG. 10 is a diagram illustrating an interface configured to set the line width.

The interface display processor 301 performs processing to display an interface configured to operate the drawing application 202 and perform setting of the drawing application 202. For example, the interface display processor 301 performs processing to display an interface 400 configured to set the line width, which is illustrated in FIG. 10. A line width space 401 and a slider bar 402 are provided in the interface 400. The value in the line width space 401 indicates the set line width. After a cursor is displayed in the line width space 401, a numerical value is input to the line width space 401, and thereby the set value can be directly changed. It is also possible to set the line width by sliding a button 402A in the slider bard 402 to right and left. The line width value which is set by the interface 400 is stored in the line width set value memory 313.

The control IC 171 obtains coordinates which indicates the position of the stylus 100, and the writing pressure. The control IC 171 outputs data which indicates data of position coordinates of the stylus and the writing pressure to the drawing application 202.

The coordinate/writing pressure obtaining processor 302 obtains the data output from the control IC 171. The frictional coefficient setting processor 303 reads a static frictional coefficient value and a dynamic frictional coefficient value from the frictional coefficient value memory 311. The frictional coefficient setting processor 303 determines a first correction quantity for the start of writing, based on the static frictional coefficient value. The frictional coefficient setting processor 303 determines a second correction quantity for the middle of writing, based on the dynamic frictional coefficient value.

The frictional coefficient setting processor 303 reads the frictional coefficient change flag from the frictional coefficient change setting memory 312.

When the frictional coefficient change flag indicates that the frictional coefficient is not changed in accordance with the writing pressure, the frictional coefficient setting processor 303 determines a third correction quantity which is added to writing pressure which is greater than or equal to the reference writing pressure value. When the frictional coefficient change flag indicates that the frictional coefficient is changed in accordance with the writing pressure, the frictional coefficient setting processor 303 determines a fourth correction quantity which is added to writing pressure which is less than or equal to the reference writing pressure value. Specifically, the frictional coefficient setting processor 303 determines the correction range and the correction quantity of the writing pressure.

The writing pressure/line width correction processor 304 reads the current set line width from the line width set value memory, and reads the correction quantity set by the frictional coefficient setting processor 303. The writing pressure/line width correction processor 304 determines a fifth correction quantity based on the time which has passed from the stylus touch. When the time which has passed from the stylus touch falls within the set time, the writing pressure/line width correction processor 304 selects the first correction quantity as the fifth correction quantity. When the time which has passed from the stylus touch is longer than the set time, the writing pressure/line width correction processor 304 selects the second correction quantity as the fifth correction quantity.

The writing pressure/line width correction processor 304 reads the correction range and the correction quantity of the writing pressure from the frictional coefficient setting processor 303. The writing pressure/line width correction processor 304 determines a sixth correction quantity, based on the writing pressure and the read correction range and correction quantity of the writing pressure. When the writing pressure falls out of the correction range of the writing pressure, the sixth correction quantity is set to zero. When the writing pressure falls within the correction range of the writing pressure, the sixth correction quantity is set to the third correction quantity or the fourth correction quantity.

The writing pressure/line width correction processor 304 determines a seventh correction quantity for the writing pressure, based on the set line width and the correction value which has been read from the writing pressure/line width correction table.

Then, the writing pressure/line width correction processor 304 adds the fifth correction quantity, the sixth correction quantity, and the seventh correction quantity to the writing pressure.

The writing pressure correction determination processor 305 reads setting as to whether the line width of the locus is changed or not in accordance with the writing pressure, from the writing pressure correction setting memory 315. When the line width of the locus is changed in accordance with the writing pressure, the writing pressure correction determination processor 305 performs no processing. When the line width of the locus is not changed in accordance with the writing pressure, the writing pressure correction determination processor 305 reads handwriting data, which was written a predetermined time ago or more, from the handwriting data memory 316, and transmits the data to the drawing data preparation processor, as data in a state where the line width of the locus is not changed.

The drawing data preparation processor 306 prepares drawing data, based on the data transmitted from the writing pressure/line width correction processor 304 and the writing pressure correction determination processor 305. When no data is transmitted from the writing pressure correction determination processor 305, the drawing data preparation processor 306 draws a locus of a line width based on the data transmitted from the writing pressure/line width correction processor 304. When data is transmitted from the writing pressure correction determination processor 305, the drawing data preparation processor 306 draws a locus of a line width based on the data transmitted from the writing pressure/line width correction processor 304, and draws a part which corresponds to the data transmitted from the writing pressure correction determination processor 305 with a locus of the set line width again.

The graphics controller 104 displays the data prepared by the drawing data preparation processor 306 on the LCD 17A.

According to the present embodiment, the writing pressure is corrected in accordance with the selected line width, and the locus is drawn thick. Thereby, the user reduces the writing pressure unconsciously, consequently the stylus is prevented from being caught by the writing surface, and the user's comfortableness in writing can be improved when stylus input is performed.

Although the above embodiment shows the example in which the writing pressure is corrected in accordance with the selected line width and the locus is drawn thicker than the locus which is drawn at the writing pressure before correction, the writing pressure may be corrected in accordance with the selected line width such that the locus is drawn thinner than the locus which is drawn at the writing pressure before correction.

In stylus input, the sensor which is provided on the stylus or touchscreen display may sense force N which is applied to the tip of the stylus in a direction perpendicular to the input surface, and force F which is applied to the tip of the stylus in a direction horizontal to the input surface, and the correction quantity may be determined based on the writing pressure and a coefficient of friction p, which is measured based on force N and force F. The coefficient of friction $\mu$ is determined by F/N.

Since the drawing processing of the present embodiment can be realized by a computer program, the same effect as that of the present embodiment can easily be achieved, only by installing the computer program in an ordinary computer through a computer-readable storage medium which stores the computer program, and executing the computer program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:
   a first obtaining module configured to detect a position of a stylus on a writing surface of a sensor;
   a second obtaining module configured to obtain writing pressure by the stylus;
   a correction module configured to correct the writing pressure obtained by the second obtaining module; and
   a drawing processor configured to draw a locus of the obtained position of the stylus on a display screen, the drawing processor having a first mode, wherein the locus has a line width based on the writing pressure corrected by the correction module in the first mode,
   wherein the correction module is configured to correct the writing pressure obtained by the second obtaining module, by using a first correction quantity based on a static frictional coefficient between the stylus and the writing surface, at start of writing by the stylus, and to correct the writing pressure obtained by the second obtaining module, by using a second correction quantity based on a dynamic frictional coefficient between the stylus and the writing surface, after the start of writing.

2. The apparatus of claim 1, further comprising:
   a detector configured to detect a frictional coefficient between the writing surface and the stylus, wherein
   the correction module is configured to correct the writing pressure, based on the frictional coefficient detected by the detector and the writing pressure.

3. The apparatus of claim 1, wherein
   the drawing module has a second mode, and the drawing module is configured to draw, in the second mode, a first locus which has a line width different from a selected second line width, and to draw a second locus which has the second line width, instead of the first locus, after a predetermined time has passed since the first locus was drawn.

4. A drawing method comprising:
   obtaining a position of a stylus on a writing surface of a sensor;

obtaining writing pressure by the stylus;
correcting the obtained writing pressure based on a selected first line width; and
drawing a locus of the obtained position of the stylus on a display screen,
wherein the drawing comprises drawing a locus having a line width which is determined in accordance with the first line width and the writing pressure corrected by the correcting in a first mode, and
the correcting comprises correcting the writing pressure, by using a first correction quantity based on a static frictional coefficient between the stylus and the writing surface, at start of writing by the stylus, and correcting the writing pressure, by using a second correction quantity based on a dynamic frictional coefficient between the stylus and the writing surface, after the start of writing.

5. The method of claim 4, wherein
the drawing, in a second mode, comprises drawing a first locus which has a line width different from a selected second line width, and drawing a second locus which has the second line width, instead of the first locus, after a predetermined time has passed since the first locus was drawn.

6. A computer-readable, non-transitory storage medium configured to store a computer program which is executable by a computer, the computer program controlling the computer to execute functions of:
obtaining a position of a stylus on a writing surface of a sensor;
obtaining writing pressure generated by the stylus;
correcting the obtained writing pressure; and
drawing a locus of the obtained position of the stylus on a display screen,
wherein the drawing includes drawing a locus having a line width which is determined in accordance with the first line width and the corrected writing pressure in a first mode, and
the correcting comprises correcting the writing pressure, by using a first correction quantity based on a static frictional coefficient between the stylus and the writing surface, at start of writing by the stylus, and correcting the writing pressure, by using a second correction quantity based on a dynamic frictional coefficient between the stylus and the writing surface, after the start of writing.

7. The program of claim 6, wherein the drawing, in a second mode, comprises drawing a first locus which has a line width different from a selected second line width, and drawing a second locus which has the second line width, instead of the first locus, after a predetermined time has passed since the first locus was drawn.

8. The apparatus of claim 1, wherein the correction module is configured to correct the writing pressure obtained by the second obtaining module based on a selected first line width.

9. An electronic apparatus comprising:
a first obtaining module configured to detect a position of a stylus on a writing surface of a sensor;
a second obtaining module configured to obtain writing pressure by the stylus;
a correction module configured to correct the writing pressure obtained by the second obtaining module; and
a drawing processor configured to draw a locus of the obtained position of the stylus on a display screen, the drawing processor having a first mode, wherein the locus has a line width based on the writing pressure corrected by the correction module in the first mode,
wherein the correction module is configured to add a third correction quantity to the obtained writing pressure, when a frictional coefficient between the writing surface and the stylus is not changed in accordance with the writing pressure and the obtained writing pressure is greater than or equal to a first reference writing pressure, and
the correction module is configured to add a fourth correction quantity to the obtained writing pressure, when the frictional coefficient between the writing surface and the stylus is changed in accordance with the writing pressure and the obtained writing pressure is less than or equal to a second reference writing pressure.

10. The apparatus of claim 9, wherein the correction module is configured to correct the writing pressure obtained by the second obtaining module based on a selected first line width.

11. The apparatus of claim 9, further comprising:
a detector configured to detect a frictional coefficient between the writing surface and the stylus, wherein
the correction module is configured to correct the writing pressure, based on the frictional coefficient detected by the detector and the writing pressure.

12. The apparatus of claim 9, wherein
the drawing module has a second mode, and the drawing module is configured to draw, in the second mode, a first locus which has a line width different from a selected second line width, and to draw a second locus which has the second line width, instead of the first locus, after a predetermined time has passed since the first locus was drawn.

13. The method of claim 4, wherein the correcting comprises correcting the writing pressure based on a selected first line width.

14. A drawing method comprising:
obtaining a position of a stylus on a writing surface of a sensor;
obtaining writing pressure by the stylus;
correcting the obtained writing pressure; and
drawing a locus of the obtained position of the stylus on a display screen,
wherein the drawing comprises drawing a locus having a line width which is determined in accordance with the first line width and the writing pressure corrected by the correcting in a first mode, and
the correcting comprises
adding a third correction quantity to the obtained writing pressure, when a frictional coefficient between the writing surface and the stylus is not changed in accordance with the writing pressure and the obtained writing pressure is greater than or equal to a first reference writing pressure, and
adding a fourth correction quantity to the obtained writing pressure, when the frictional coefficient between the writing surface and the stylus is changed in accordance with the writing pressure and the obtained writing pressure is less than or equal to a second reference writing pressure.

15. The method of claim 14, wherein the correcting comprises correcting the writing pressure based on a selected first line width.

16. The method of claim 14, further comprising:
the drawing, in a second mode, comprises drawing a first locus which has a line width different from a selected second line width, and drawing a second locus which has the second line width, instead of the first locus, after a predetermined time has passed since the first locus was drawn.

17. The medium of claim 6, wherein the correcting comprises correcting the writing pressure based on a selected first line width.

18. A computer-readable, non-transitory storage medium configured to store a computer program which is executable by a computer, the computer program controlling the computer to execute functions of:
    obtaining a position of a stylus on a writing surface of a sensor;
    obtaining writing pressure generated by the stylus;
    correcting the obtained writing pressure; and
    drawing a locus of the obtained position of the stylus on a display screen,
    wherein the drawing includes drawing a locus having a line width which is determined in accordance with the first line width and the corrected writing pressure in a first mode, and
    the correcting comprises
        adding a third correction quantity to the obtained writing pressure, when a frictional coefficient between the writing surface and the stylus is not changed in accordance with the writing pressure and the obtained writing pressure is greater than or equal to a first reference writing pressure, and
        adding a fourth correction quantity to the obtained writing pressure, when the frictional coefficient between the writing surface and the stylus is changed in accordance with the writing pressure and the obtained writing pressure is less than or equal to a second reference writing pressure.

19. The medium of claim 18, wherein the correcting comprises correcting the writing pressure based on a selected first line width.

20. The medium of claim 18, further comprising:
    the drawing, in a second mode, comprises drawing a first locus which has a line width different from a selected second line width, and drawing a second locus which has the second line width, instead of the first locus, after a predetermined time has passed since the first locus was drawn.

\* \* \* \* \*